United States Patent
Wang et al.

(10) Patent No.: US 9,864,711 B2
(45) Date of Patent: Jan. 9, 2018

(54) AUTOMATIC DOWNSTREAM TO UPSTREAM MODE SWITCHING AT A UNIVERSAL SERIAL BUS PHYSICAL LAYER

(75) Inventors: Jennifer C. Wang, Tempe, AZ (US); Alejandro Lenero Beracoechea, Phoenix, AZ (US); Nai-Chih Chang, Chandler, AZ (US); Steven B. McGowan, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 490 days.

(21) Appl. No.: 13/976,010

(22) PCT Filed: Dec. 16, 2011

(86) PCT No.: PCT/US2011/065610
§ 371 (c)(1),
(2), (4) Date: Jun. 25, 2013

(87) PCT Pub. No.: WO2013/089789
PCT Pub. Date: Jun. 20, 2013

(65) Prior Publication Data
US 2013/0275640 A1    Oct. 17, 2013

(51) Int. Cl.
*G06F 13/36* (2006.01)
*G06F 13/40* (2006.01)

(52) U.S. Cl.
CPC .......... *G06F 13/36* (2013.01); *G06F 13/4022* (2013.01); *G06F 13/4081* (2013.01); *G06F 2213/0042* (2013.01)

(58) Field of Classification Search
None
See application file for complete search history.

(56) References Cited

U.S. PATENT DOCUMENTS

| | | |
|---|---|---|
| 2006/0056401 A1 | 3/2006 | Bohm et al. |
| 2007/0255885 A1 | 11/2007 | Bohm et al. |
| 2008/0244108 A1* | 10/2008 | Abramson .......... G06F 13/4291 710/16 |

(Continued)

FOREIGN PATENT DOCUMENTS

| | | |
|---|---|---|
| JP | 2001-177543 A | 6/2001 |
| KR | 10-2007-0105855 A | 10/2007 |
| KR | 10-2007-0118691 A | 12/2007 |

OTHER PUBLICATIONS

Anil Kumar Patro, "Element 14: Super Speed USB 3.0 (5Gbps)—Future of Digital Communication", Global Technology Centre, vol. 1, Apr. 2011.*

(Continued)

*Primary Examiner* — Idriss N Alrobaye
*Assistant Examiner* — Dayton Lewis-Taylor

(57) ABSTRACT

Examples are disclosed for automatic downstream to upstream mode switching at a universal serial bus (USB) physical (PHY) layer including activating a switching structure to switch a USB port operating in a downstream mode to an upstream mode based on an attempted attachment by another USB port also operating in a downstream mode. The examples may also include facilitating attachment of the switched USB port now operating in the upstream mode to the other USB port operating in the downstream mode.

19 Claims, 7 Drawing Sheets

(56) References Cited

U.S. PATENT DOCUMENTS

| | | |
|---|---|---|
| 2010/0077126 A1 | 3/2010 | Huang et al. |
| 2010/0090644 A1* | 4/2010 | Nokkonen ................ G06F 1/26 710/300 |
| 2011/0013624 A1 | 1/2011 | Lerzer et al. |

OTHER PUBLICATIONS

Jay Trodden, "EHCI: Enhanced Host Controller Interface for USB 2.0", MindShare, Inc. Sep. 10, 2001.*
Extended European Search Report received for European Patent Application No. 11877596.4, dated Jul. 8, 2015, 5 pages.
International Search Report and Written Opinion, dated Aug. 30, 2012, Application No. PCT/US2011/065610, Filed Date: Dec. 16, 2011, pp. 9.

* cited by examiner

AUTOMATIC DOWNSTREAM TO UPSTREAM MODE SWITCHING AT A UNIVERSAL SERIAL BUS PHYSICAL LAYER

BACKGROUND

Computing devices typically include one or more Universal Serial Bus (USB) ports to couple to other computing devices. These USB ports may be operated or controlled in compliance with various USB technical standards or specifications. For example, computing devices may include USB controllers to control the USB ports in accordance with the enhanced Host Controller Interface (eHCI) for USB specification, revision 1.0, published March 2002 or the extensible Host Controller Interface (xHCI) for USB specification, revision 1.0, published May 2010. The eHCI specification is commonly associated with USB controllers configured to operate according to the USB specification version 2.0 (USB2), published April 2000. The xHCI specification is commonly associated with USB controllers configured to operate according to the USB specification version 3.0 (USB3), published November 2008.

USB is based on a hierarchical communication protocol that includes host computing devices coupling to peripherals via USB ports configured to operate in a downstream mode. Meanwhile the peripherals couple to the host computing device via USB ports configured to operate in an upstream mode. The recent and rapid rise in the use of various portable or mobile computing devices such as notebooks, ultra mobile personal computers, tablets or smart phones has resulted in computing devices that may serve as a host computing device (e.g., coupling to external storage or a printer) or a peripheral (e.g., syncing with a desktop or laptop computer). Additional USB ports and controllers with increased capabilities may be needed to allow for portable or mobile computing devices to serve as either a host or a peripheral device.

DETAILED DESCRIPTION

As contemplated in the present disclosure, additional USB ports and controllers with increased capabilities may be needed to allow for portable or mobile computing devices to serve as either a host or a peripheral device. One way this problem has been addressed is a solution known as USB On-The-Go or USB OTG. However, USB OTG may require USB controllers to have enhanced capabilities. Also, portable computing devices may be excessively burdened to support USB OTG due to implementing a possibly resource-intensive USB OTG protocol. Further, limited space on these computing devices may be problematic to having additional USB ports that don't support the processor intensive USB OTG protocol.

In some examples, techniques are implemented for automatic downstream to upstream mode switching at a USB physical (PHY) layer. For these examples, a processor circuit may monitor a first USB port for a first computing device. The first USB port may be operating in a downstream mode. A determination that a second USB port for a second computing device has attempted to attach to the first USB port operating in the downstream mode may be made. The second USB port may also be operating in the downstream mode. According to these examples, a switching structure at a PHY layer for the first USB port may be activated to switch the first USB port from operating in the downstream mode to operating in an upstream mode. An attachment of the first USB port operating in the upstream mode to the second USB port operating in the downstream mode may then be facilitated.

Figure 1:
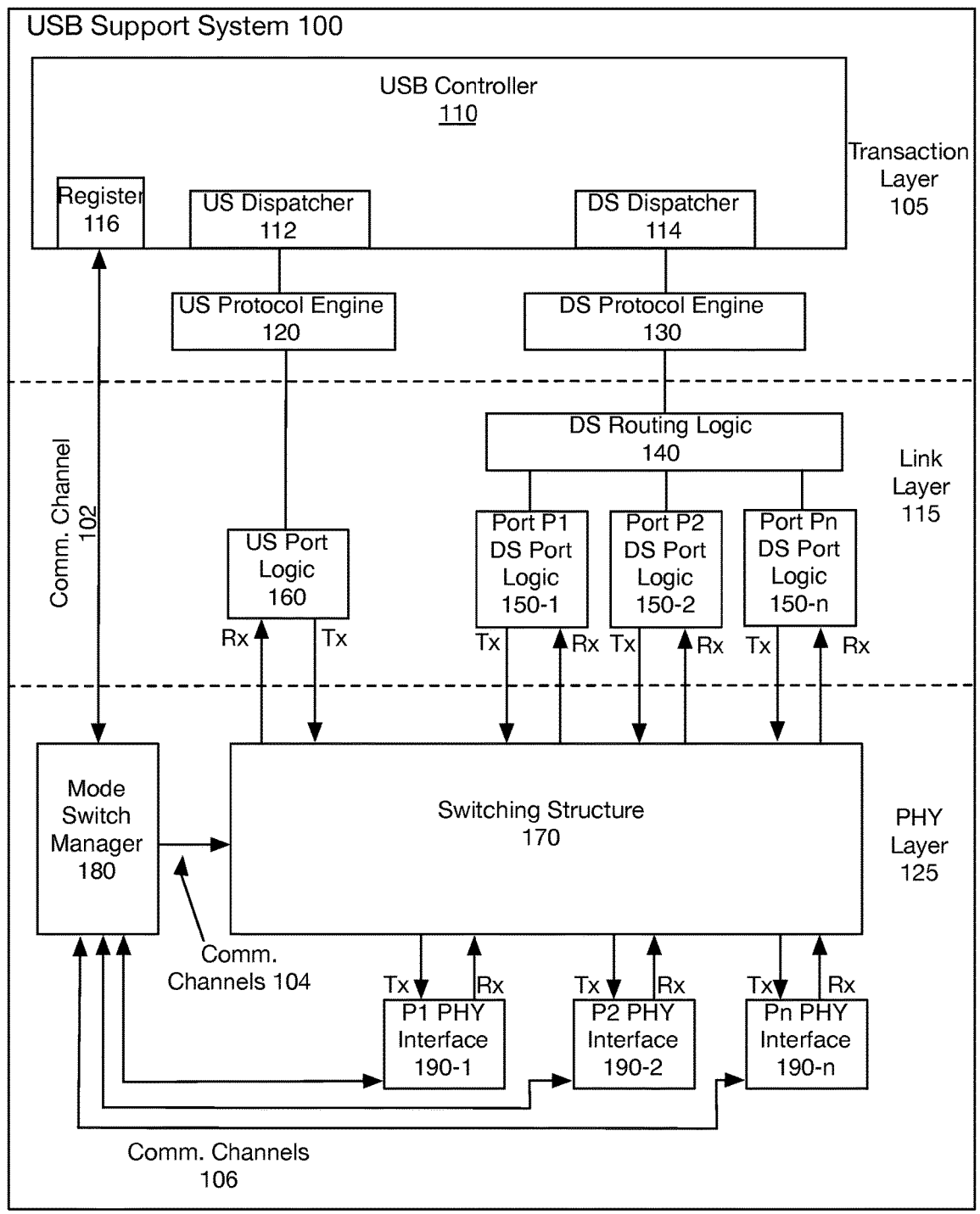
FIG. 1 illustrates an example USB support system.

FIG. 1 illustrates an example USB support system 100. As shown in FIG. 1, USB support system 100 includes a USB controller 110, upstream (US) protocol engine 120, downstream (DS) protocol engine 130, downstream (DS) routing logic 140, downstream (DS) port logic 150-1 to 150-n ("n" equals any positive integer greater than 2), upstream (US) port logic 160 (although this disclosure is not limited to a single US port logic), switching structure 170, mode switch manager 180 and physical (PHY) interface 190-1 to 190-n. Also, as shown in FIG. 1, USB support system 100 includes communication channel 102, communication channels 104 and communication channels 106 coupling mode switch manager 180 to USB controller 110, switching structure 170 and PHY interfaces 190-1 to 190n, respectively. USB support system 100, as shown in FIG. 1, has transaction layer 105, link layer 115 and a physical (PHY) layer 125.

According to some examples, as shown in FIG. 1, USB controller 110 includes upstream (US) dispatcher 112, downstream (DS) dispatcher 114 and register 116. These elements of USB controller 110 may operate in cooperation with elements of USB system 100 to control or manage both upstream and downstream communications (including data and control information) from USB ports P1 to Pn. In some examples, register 116 may be configured to at least temporarily maintain USB port state or status information that may indicate whether a particular USB port (e.g., P1) is in an active or inactive state.

In some examples, US protocol engine 120 and DS protocol engine 130 may facilitate upstream and downstream communications. For example, US protocol engine 120 and DS protocol engine 130 may facilitate the assembly of data packets to be forward to elements at link layer 115. Also, US protocol engine 120 and DS protocol engine 130 may disassemble data packets received from elements at link layer 115.

According to some examples, as shown in FIG. 1, USB support system 100 includes DS routing logic 140, DS port logic 150-1 to 150-n for USB ports P1 to Pn and US port logic 160 at link layer 115. For these examples, a plurality of USB ports P1 to Pn may be configured to operate in a downstream mode (e.g., as a host) and may route downstream communications (e.g., to peripheral(s)) through PHY interfaces 190-1 to 190-n. Thus, DS routing logic 140 may be configured to cooperate with one of DS port logic 150-1 to 150-n to route these downstream communications through a given USB port. However, for these examples, a single US port logic 160 may be configured to operate in an upstream mode (e.g., as a peripheral) to indicate that a computing device having USB support system 100 may need to utilize just a single USB port to handle upstream communications (e.g., from a host) received from one of PHY interfaces 190-1 to 190-n. Both downstream and upstream communications, for example, separately include transmitting (Tx) and receiving (Rx) communication links.

In some examples, as described in more detail below, switching structure 170 located at physical layer 125 may be configured to enable mode switch manager 180 to switch a given USB port (e.g., USB port P1) operating in a downstream mode to an upstream mode. For these examples, switching structure 170 may include switching elements such a multiplexors and associated control signal paths to enable automatic downstream to upstream mode switching for the given USB port at PHY layer 125. Automatic downstream to upstream mode switching at PHY layer 125, for example, may allow USB support system 100 to enable a computing device to selectively become either a host or peripheral using hardware-based and/or firmware-based elements.

According to some examples, mode switch manager 180 may include logic and/or features configured to monitor a USB port such as USB port 1. For these examples, USB port P1 may be operating in a downstream mode for a first computing device (not shown). As described more below, switch manager 180 may determine that a USB port for a second computing device (also not shown) has attempted to attach to USB port P1 based on port state information maintained at a register (e.g., register 116 obtained via communication channel 102) or based on signals observed from a PHY interface for USB port P1 (e.g., PHY interface 190-1 received via communication channels 106). The port state information may indicate that the second computing device was attempting to attach as a host computing device. For example, the USB port for the second computing device may be operating in a similar or the same downstream mode to the downstream operating mode of USB port P1.

In some examples, mode switch manager 180 may include logic and/or features configured to activate elements of switching structure 170 to switch USB port P1 from operating in the downstream mode to operating in an upstream mode. For these examples, mode switch manager 180 may utilize one or more communication channels (e.g., communication channels 104) to initiate or cause the mode switch. Switch manager 180 may also include logic and/or features to utilize additional communication channels (e.g., communication channels 106) to initiate or cause the mode switch through control signals forwarded to a PHY interface for USB port P1 that is shown in FIG. 1 as PHY interface 190-1.

According to some examples, mode switch manager 180 may include logic and/or features configured to facilitate attachment of USB port P1 now operating in the upstream mode to the USB port for the second computing device operating in the downstream mode. For these examples, mode switch manager 180 may forward control signals to PHY interface 190-1 that may cause USB port P1 to appear to the USB port for the second computing device as a new attachment. For this new attachment, USB port P1 may appear as a USB port operating in the upstream mode.

In some examples, elements of USB support system 100 may operate in compliance with the both progenies and variants of the USB specification (e.g., USB 3.0 or USB 2.0). Also, elements such as USB controller 110 at transaction layer 105 or PHY interfaces 190-1 to 190-n at PHY layer 125 may operate according to various specifications associated with the USB specification. For example, elements of USB controller 110 may be operated in accordance with the eHCI for USB specification and/or the xHCI for USB specification. Also, PHY interfaces 190-1 to 190-n may be operated in accordance with all progenies and variants of the PCI Express and USB 3.0 Architectures (PIPE3) specification, revision 3.0 published March 2009 the USB Transceiver Macrocell Interface (UTMI) specification, version 1.05, published March 2001 or the USB Low Pin Interface (ULPI) specification, revision 1.1, published October 2004.

In some examples, USB support system 100 may be included in a computing device. Examples of a computing device may include a desktop computer, personal computer (PC), laptop computer, ultra-mobile computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 2:
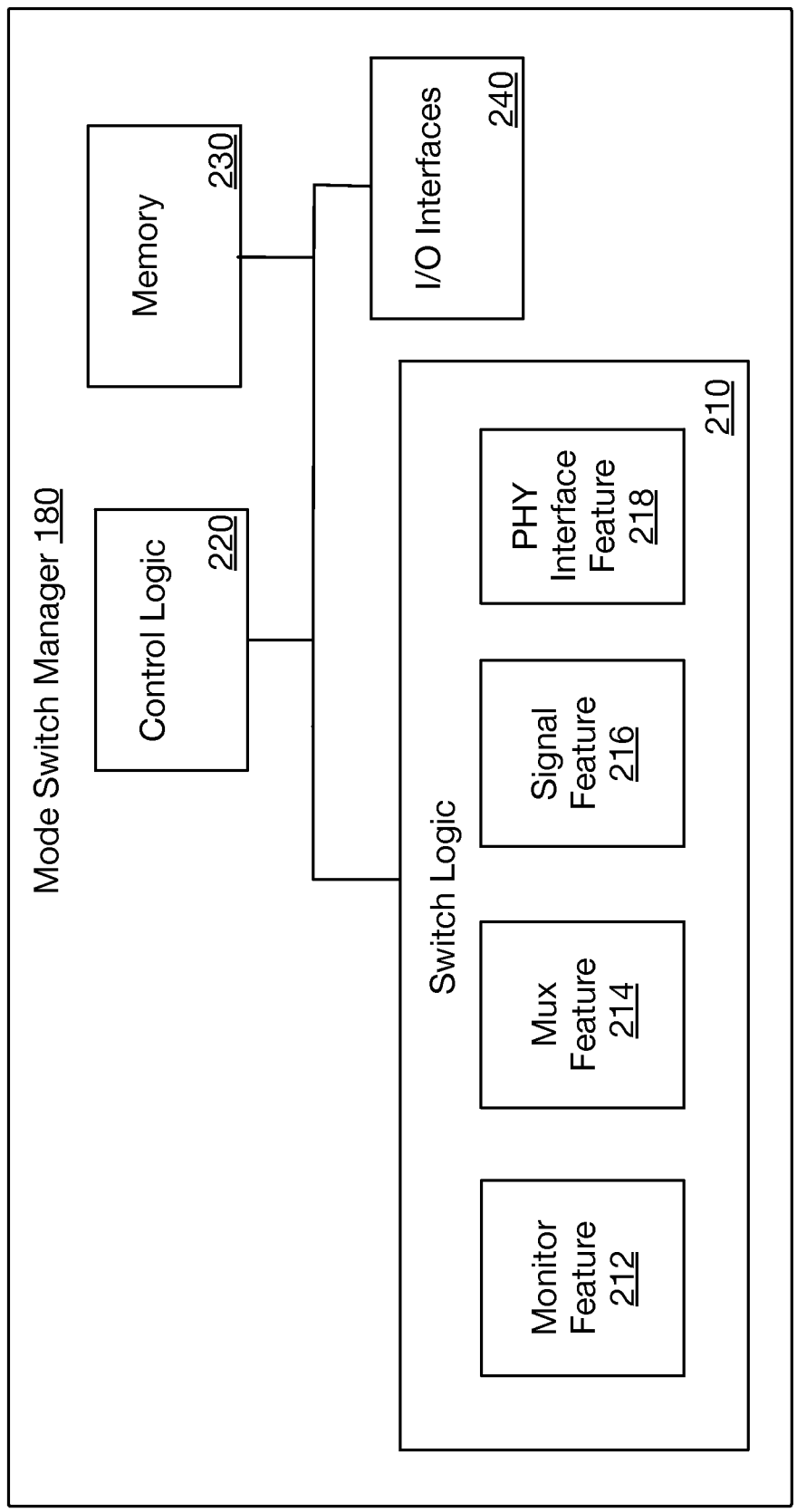
FIG. 2 illustrates a block diagram of an example architecture for a mode switch manager.

FIG. 2 illustrates a block diagram of an example architecture for mode switch manager 180. As described above for FIG. 1, a USB support system for a computing device such as USB support system 100 may include mode switch manager 180. In some examples, mode switch manager 180 includes features and/or logic configured or arranged for automatic downstream to upstream mode switching at a USB PHY layer including activating a switching structure to switch a USB port operating in a downstream mode to an upstream mode based on an attempted attachment by another USB port also operating in a downstream mode.

The example mode switch manager 180 of FIG. 2, includes switch logic 210, control logic 220, a memory 230 and input/output (I/O) interfaces 240. As illustrated in FIG. 2, Switch logic 210 may be coupled to control logic 220, memory 230 and I/O interfaces 240. Switch logic 210 may include one or more of a monitor feature 212, a mux feature 214, a signal feature 216, or a physical (PHY) interface feature 218, or any reasonable combination thereof.

In some examples, the elements portrayed in FIG. 2 are configured to support or enable mode switch manager 180 as described in this disclosure. A given mode switch manager 180 may include some, all or more elements than those depicted in FIG. 2. For example, switch logic 210 and control logic 220 may separately or collectively represent a wide variety of logic device(s) or executable content to implement the features of mode switch manager 180. Example logic devices may include one or more of a microprocessor, a microcontroller, a process circuit, a field programmable gate array (FPGA), an application specific integrated circuit (ASIC), a sequestered thread or a core of a multi-core/multi-threaded microprocessor or a combination thereof.

In some examples, as shown in FIG. 2, switch logic 210 includes monitor feature 212, mux feature 214, signal feature 216, or PHY interface feature 218. Switch logic 210 may be configured to use one or more of these features to perform operations. For example, monitor feature 212 may monitor one or more USB ports for a first computing device to determine whether a second USB port for a second computing device is attempting to attach to one of the one or more USB ports. Monitor feature 212 may also detect detachments and whether the first computing device is powering down. Mux feature 214, for example, may generate mux select signals to activate elements of a switching structure to cause the first USB port to switch between operating in a downstream mode or operating in an upstream mode. Signal feature 216 may generate signals to facilitate attachment of the first USB port to the second USB port for the second computing device. PHY interface feature 218 may also generate signals to also facilitate attachment of the first USB port to the second USB port.

In some examples, control logic 220 may be configured to control the overall operation of mode switch manager 180. As mentioned above, control logic 220 may represent any of a wide variety of logic device(s) or executable content. For some examples, control logic 220 may be configured to operate in conjunction with executable content or instructions to implement the control of mode switch manager 180. In some alternate examples, the features and functionality of control logic 220 may be implemented within switch logic 210.

According to some examples, memory 230 may be arranged to store executable content or instructions for use by control logic 220 and/or switch logic 210. The executable content or instructions may be used to implement or activate features or elements of mode switch manager 180. As described more below, memory 230 may also be arranged to at least temporarily maintain information associated with USB port operating modes or USB port states.

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via a local communication medium or link between mode switch manager 180 and elements of USB support system 100 depicted in FIG. 1. I/O interfaces 240 may include interfaces that operate according to various communication protocols or standards to communicate over the local communication medium or link. These communication protocols or standards may be described in one or one or more industry standards (including progenies and variants) such as those associated with the Inter-Integrated Circuit ($I^2C$) specification or the System Management Bus (SMBus) specification. Also, I/O interfaces 240 may operate according to custom or proprietary communication protocols.

Figure 3:
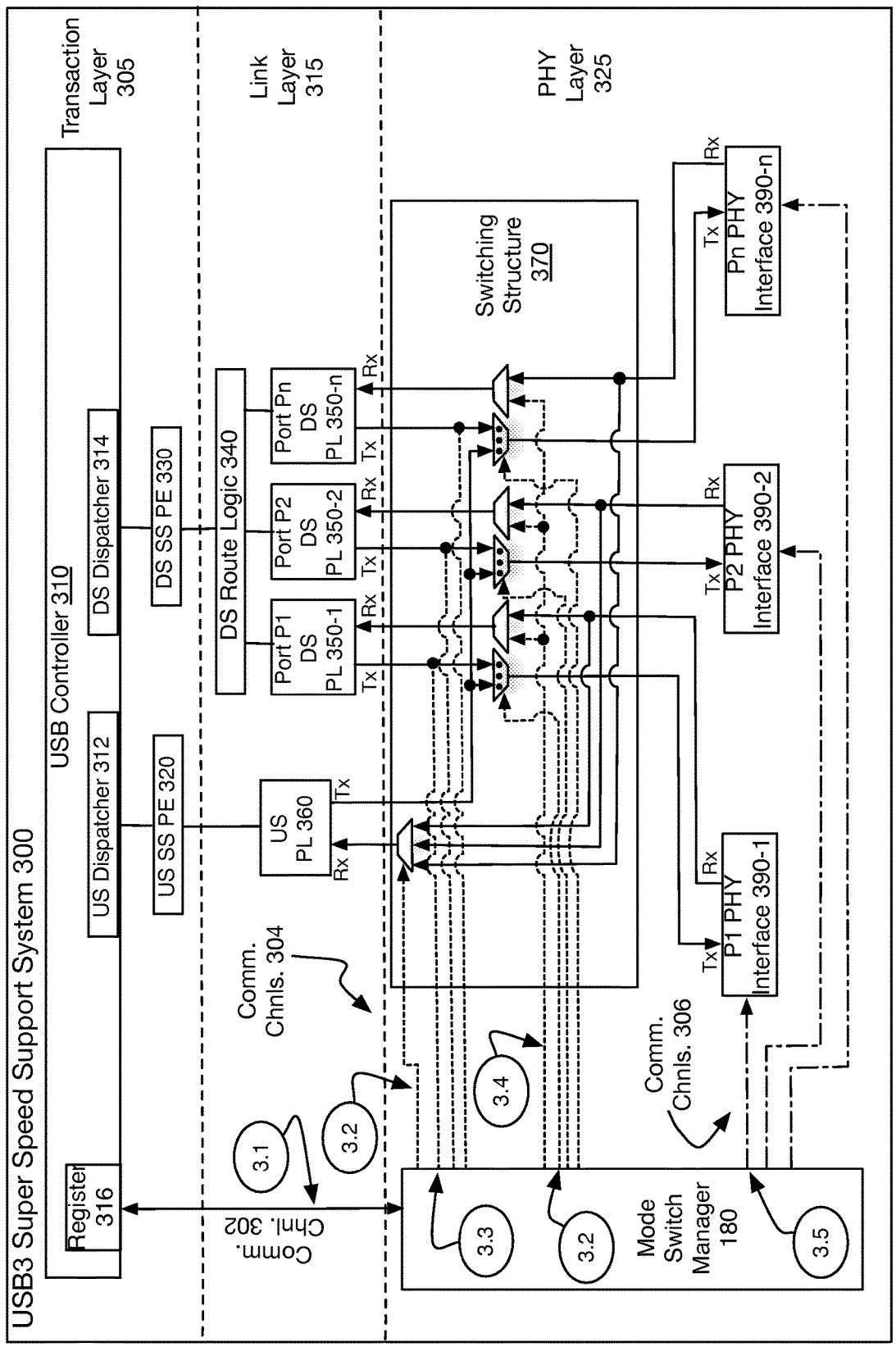
FIG. 3 illustrates an example USB3 support system.

FIG. 3 illustrates an example USB3 Super Speed support system 300. In some examples, USB3 Super Speed support system 300 may operate in accordance with the USB specification version 3.0. Similar to USB support system 100 in FIG. 1, USB3 Super Speed support system 300 includes a USB controller 310, US Super Speed (SS) protocol engine (PE) 320, DS Super Speed (SS) protocol engine (PE) 330, DS route logic 340, DS port logic (PL) 350-1 to 350-n and US port logic (PL) 360, switching structure 370, mode switch manager 180 and physical (PHY) interface 390-1 to 390-n. Also, as shown in FIG. 3, USB3 Super Speed support system 300 includes communication channel 302, communication channels 304 and communication channels 306 coupling mode switch manager 180 to USB controller 310, switching structure 370 and PHY interfaces 390-1 to 390n, respectively. USB3 Super Speed support system 300, as shown in FIG. 3, has transaction layer 305, link layer 315 and a physical (PHY) layer 325.

According to some examples, elements of USB controller 310 may be operated in accordance with the xHCI for USB specification or any other controller specification capable of managing USB3 Super Speed. These elements of USB controller 310, for example, may include US dispatcher 312, DS dispatcher 314 and register 316. For these examples, register 316 may be a port status and control (PORTSC) register to at least temporarily maintain port state or status information for USB ports P1 to Pn. The port state or status information, for example, may indicate whether a particular USB port (e.g., P1) is in an active or inactive state. Mode switch manager 180 may include logic and/or features configured to access register 316 to obtain port state information for USB ports P1 to Pn via communication channel 302. Communication channel 302 is depicted in FIG. 3 as a solid line running between mode switch manager 180 and USB3 controller 310.

In some examples, US SS PE 320, DS SS PE 330, DS route logic 340, DS PL 350-1 to 350-n and US PL 360 may operate similar to protocol engines, route logic and port logic described above for FIG. 1. As mentioned above for FIG. 1, USB ports P1 to Pn may be configured to operate in either a downstream or upstream mode and in some examples, US SS PE 320, DS SS PE 330, DS route logic 340, DS PL 350-1 to 350-n and US PL 360 may assist in the routing of upstream or downstream communications at link layer 315 or transaction layer 305.

According to some examples, PHY interfaces 390-1 to 390-n may be operated in accordance with the PIPE3 specification. PHY interfaces 390-1 to 390-n, for example, may assist in the routing of upstream or downstream communications at PHY layer 325.

Figure 4:
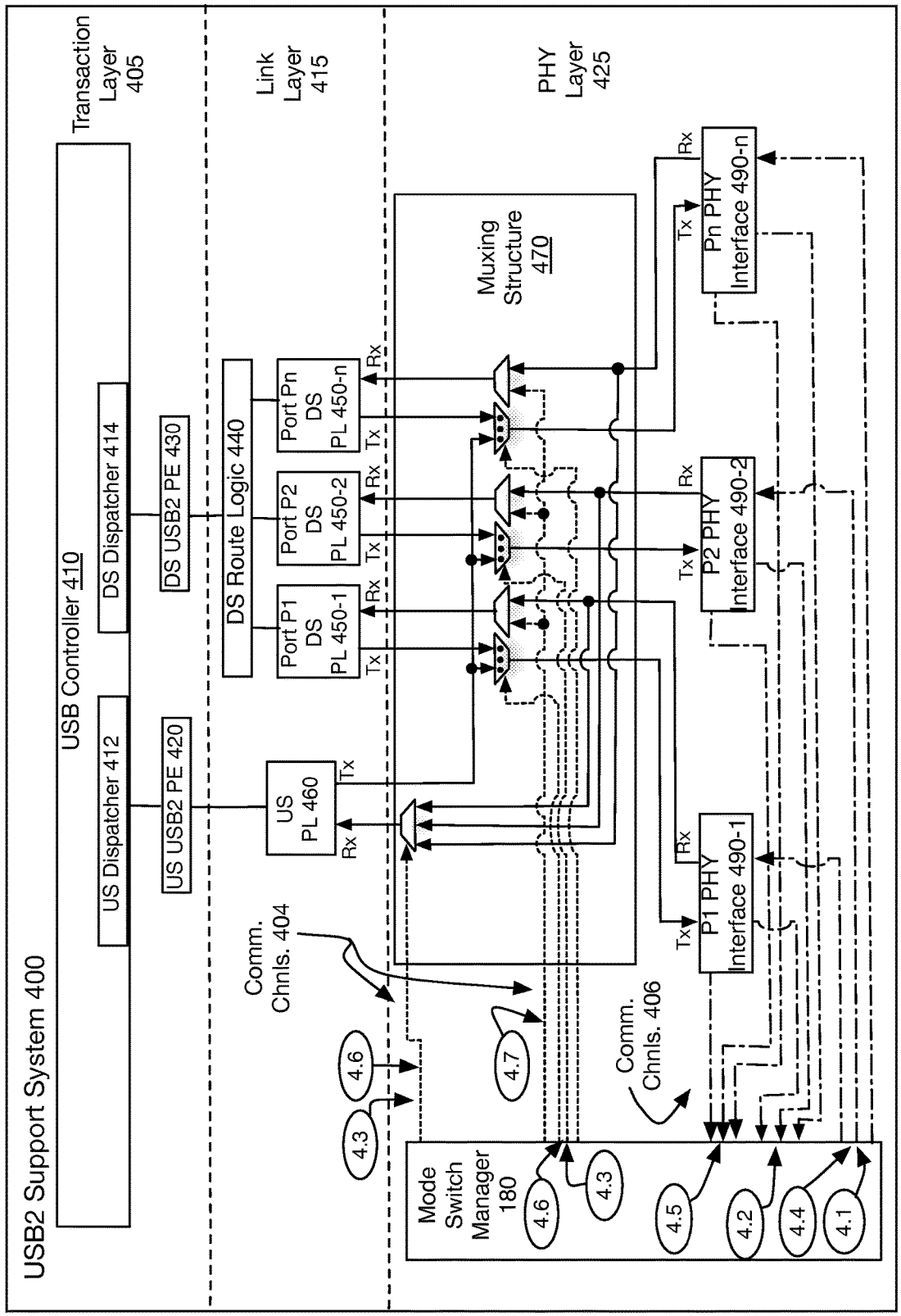
FIG. 4 illustrates an example USB2 support system.

According to some examples, as shown in FIG. 3, switching structure 370 includes a plurality of multiplexors coupled to Tx and Rx communication links between DS PL 350-1 to 350-n, US PL 360 and PHY interfaces 390-1 to 390-n. These Tx and Rx communication links are depicted in FIG. 3 as solid lines having directional arrows. Mode switch manager 180 may include logic and/or features configured to relay signals to the multiplexors of switching structure 370 via communication channels 304. Communication channels 304 are depicted in FIG. 4 as dotted lines running between mode switch manager 180 and elements in switching structure 370.

In some examples, mode switch manager 180 may include logic and/or features configured to relay signals to PHY interfaces 390-1 to 390-n via communication channels 306 to facilitate attachment of other computing devices to the computing device having USB3 Super Speed support system 300. Communication channels 306 are depicted in FIG. 3 as mixed dotted-dash lines running between mode switch manager 180 and PHY interfaces 390-1 to 390-n.

According to some examples, for USB3 Super Speed support system 300 an initial operating mode for USB ports P1 to Pn may be a downstream operating mode (host role). For these examples, a system power reset for a computing device or chip having USB3 support system 300 may occur. If another computing device having a USB port operating in an upstream mode (peripheral role) attempts to attach to one of USB ports P1 to Pn, then an attachment negotiation may occur as defined in the USB3 specification. Therefore, in an initial downstream to upstream scenario, no mode switches occurs for USB ports P1 to Pn.

In some examples, another computing device having a USB port operating in a downstream mode (host role) attempts to attach to one of USB ports P1 to Pn. An operating mode switch or role reversal may occur for the USB port via which the other computing device is attempting to attach. For these examples, USB port P1 may be the downstream operating USB port of USB3 support system 300 via which the other computing device attempts to attach. In accordance with the USB3 specification, USB controller 310 may include logic and/or features to detect an attachment at USB port P1 and USB controller 310 may initiate a link training sequence with the USB port for the other computing device. Upon successful link training, a link training and status state machine (LTSSM) associated with USB port P1 and the USB port for the other computing device may enter a state identified in the USB3 specification as an U0 state. This state for USB port P1, for example, may be indicated in register 316. Once in the U0 state, USB controller 310 may send a port capability link management packet (LMP) indicating USB port P1's downstream operating mode and receives a similar LMP from the other computing device. Since both ports are operating in the downstream mode, according to the USB3 specification, a successful link configuration is not possible. The LTSSM may now change the status of USB port P1 from U0 to an inactive state. The indication of the inactive state may be indicated in register 316.

According to some examples, mode switch manager 180 in cooperation with switching structure 370 may implement various example operations shown in FIG. 3 as 3.1 to 3.5 to enact automatic mode switching at USB port P1. For these examples, USB port P1 may be switched from the downstream operating mode to an upstream operating mode to enable a successful link configuration with the USB port of the other computing device.

Beginning at example operation 3.1, mode switch manager 180 may monitor register 316 for an indication that a USB port from among USB ports P1 to Pn has entered an inactive state. This monitoring may occur via communication channel 302. As mentioned above, USB port P1 has entered an inactive state following an unsuccessful attempt by the USB port for the other computing device to attach to USB port P1.

Moving to example operation 3.2, mode switch manager 180 may detect the change in the state to the inactive state and responsive to the inactive state may generate mux select signals to a multiplexor coupled to US PL 360 and to a multiplexor coupled to DS PL 150-1. The mux select signals, for example, causes elements of USB controller 310, US SS PE 320, US PL 360 and PHY interface 390-1 to all now treat USB port P1 as operating in an upstream mode. Thus USB port P1 has been switched from operating in the downstream mode to now operating in an upstream mode Also, during the time of operation 3.2, mode switch manager 180 implements example operation 3.3 and monitors PowerDown [1:0] and the TxDetectRx signals at the Tx link coupling USB port P0 to PHY interface 390-1. In some examples, when PowerDown is set to 11b or 10b and the TxDetectRx is asserted, mode switch manager 180 implements example operation 3.4 and drives PhyStatus to 1b and the RxStatus to 000b. For these examples, according to the PIPE3 specification, driving PhyStatus to 1b and the RxStatus to 000b indicates to the other computing device that no receiver is detected.

In some examples, mode switch manager 180 may then implement example operation 3.5 by sending a signal to PHY interface 390-1 to drive RxTermination to 0b for a period of time (e.g., 12 milliseconds (ms)). The period of time may be based on an amount of time via which the other computing device determines that USB port P1 has powered down or become detached. After the period of time has expired, mode switch manger 180 stops driving RxTermination to 0b and this causes DS SS PE 330 to drive RxTermination to 1b. The other computing device, for example, interprets the RxTermination of 1b as a new attachment via USB port P1 and a link training sequence is started again. After a successful link training, both the USB port for the other computing device and USB port P1 may enter the U0 state again.

Based on the USB port for the other computing device and USB port P1 entering the U0 state, each port will again exchange port capability link management packets (LMPs). However, this time around USB port P1 indicates the upstream operating mode. For these examples, the USB port for the other computing device operating in the downstream mode and USB port P1 switched to now operate in the upstream mode leads to a successful configuration.

According to some examples, responsive to detection of a detachment of the USB port for the other computing device, USB port P1 may be reset back to the downstream mode of operation. For example, mode switch manager 180 may generate mux select signals to the multiplexor coupled to US PL 360 and to a multiplexor coupled to DS PL 150-1 to switch USB port P1 back to operating in the downstream mode.

FIG. 4 illustrates an example USB2 support system 400. In some examples, USB2 support system 400 may operate in accordance with the USB specification version 2.0. Similar to USB support system 100 in FIG. 1 and USB3 Super Speed support system 300 in FIG. 3, USB2 support system 400 includes a USB controller 410, US USB2 protocol engine (PE) 420, DS USB2 protocol engine (PE) 430, DS route logic 440, DS port logic (PL) 450-1 to 450-*n* and US port logic (PL) 460, switching structure 470, mode switch manager 180 and physical (PHY) interface 490-1 to 490-*n*. Also, as shown in FIG. 4, USB2 support system 400 includes communication channel 402 and communication channels 404 coupling mode switch manager 180 to switching structure 470 and PHY interfaces 490-1 to 490*n*, respectively. USB2 support system 400, as shown in FIG. 4, has transaction layer 405, link layer 415 and a physical (PHY) layer 425.

According to some examples, elements of USB controller 410 may be operated in accordance with the xHCI for USB specification, the eHCI for USB specification or any other USB controller specification capable of managing USB2. These elements of USB2 controller 410, for example, may include US dispatcher 412 and DS dispatcher 414.

In some examples, US USB2 PE 420, DS USB2 PE 430, DS route logic 440, DS PL 450-1 to 450-*n* and US PL 460 may operate similar to protocol engines, route logic and port logic described above for FIGS. 1 and 3. As mentioned above for FIGS. 1 and 3, USB ports P1 to Pn may configured to operate in either a downstream or upstream mode and in some examples, US USB2 PE 420, DS USB2 PE 430, DS route logic 440, DS PL 450-1 to 450-*n* and US PL 460 may assist in the routing of upstream or downstream communications at link layer 415 or transaction layer 405.

According to some examples, PHY interfaces 490-1 to 490-*n* may be operated in accordance with the UTMI specification or the ULPI specification. PHY interfaces 490-1 to 490-*n*, for example, may assist in the routing of upstream or downstream communications at PHY layer 425.

According to some examples, as shown in FIG. 4, switching structure 470 includes a plurality of multiplexors coupled to Tx and Rx communication links between DS PL 450-1 to 450-*n*, US PL 460 and PHY interfaces 490-1 to 490-*n*. These Tx and Rx communication links are depicted in FIG. 4 as solid lines having directional arrows. Mode switch manager 180 may include logic and/or features configured to relay signals to the multiplexors of switching structure 470 via communication channels 404. Communication channels 404 are depicted in FIG. 4 as dotted lines running between mode switch manager 180 and elements in switching structure 470.

In some examples, mode switch manager 180 may include logic and/or features configured to relay signals to and from PHY interfaces 490-1 to 490-n via communication channels 406 to either detect or facilitate attachment of other computing devices to the computing device having USB2 support system 400. Communication channels 406 are depicted in FIG. 4 as mixed dotted-dash lines running between mode switch manager 180 and PHY interfaces 490-1 to 490-n.

According to some examples, mode switch manager 180 in cooperation with switching structure 470 may implement various example operations shown in FIG. 4 as 4.1 to 4.7 to enact automatic mode switching of a USB port from among USB ports P1 to Pn. Beginning at example operation 4.1, mode switch manager 180 may drive a power signal line identified in the UTMI specification or the ULPI specification as VBus (not shown) for a period of time while also pulling down D+/D− pull-up/pull-down resistors (not shown) maintained at PHY interface 490-2. While mode switch manager 180 is implementing example operation 4.1, mode switch manager 180 may also implement example process 4.2 to monitor D+/D− lane states for all unconnected ports from among USB ports P1 to Pn. In some examples, mode switch manager 180 may be monitoring the D+/D− lane states to determine whether a USB port for another computing device is attempting to attach as a peripheral (e.g., operating in an upstream mode) to one of USB ports P1 to Pn.

In some examples, example operation 4.3 may be implemented if mode switch manager 180 detects an attachment of an upstream operating USB port for another computing device (e.g., to USB port P2). For example operation 4.3, mode switch manager 180 may generate mux select signals to a multiplexor coupled to US PL 460 and to a multiplexor coupled to DS PL 450-1 to have USB port P2 operate in a downstream mode (host role). For these examples, USB port P2 may continue operating in the downstream mode until the other computing device detaches.

In alternative examples, mode switch manager 180 may implement example process 4.4 when a peripheral device (USB port operating in upstream mode) is not detected. Mode switch manager 180 may stop driving VBus while still enabling D+/D− pull-up/pull-down resistors at PHY Interfaces 490-1 to 490-n. While implementing example process 4.4, mode switch manager 180 also implements example process 4.5 and monitors VBus states at PHY Interfaces 490-1 to 490n. For these examples, mode switch manager 180 may detect that VBus is present or driven for a PHY Interface associated with one of USB ports P1 to Pn, e.g. PHY interface 490-2 for USB port P2. In this case, mode switch manager 180 implements example operation 4.6 and generates mux select signals to the multiplexor coupled to US PL 460 and to the multiplexor coupled to DS PL 450-2 to have USB port P2 operate in an upstream mode (peripheral role). Mode switch manager 180 may then implement example operation 4.7 to relay signals to the multiplexor coupled to DS PL 450-2 and to PHY interface 490-2 to make it appear that USB port P2 is an unconnected downstream port. However, as mentioned above, USB port P2 is actually operating in an upstream mode of operation.

According to some examples, a USB support system combining both the elements of USB3 Super Speed support system 300 and USB2 support system 400 may be included in a computing device. For these examples, a given USB port for this type of system may have logic and/or features to support either USB3 or USB2 attachments to a USB port for another computing device. Also, logic and/or features of this type of system may configured to allow a mode switch manager 180 to activate a switching structure similar to either switching structure 370 or 470 to enable automatic downstream to upstream operating mode switching for the given USB port.

Figure 5:
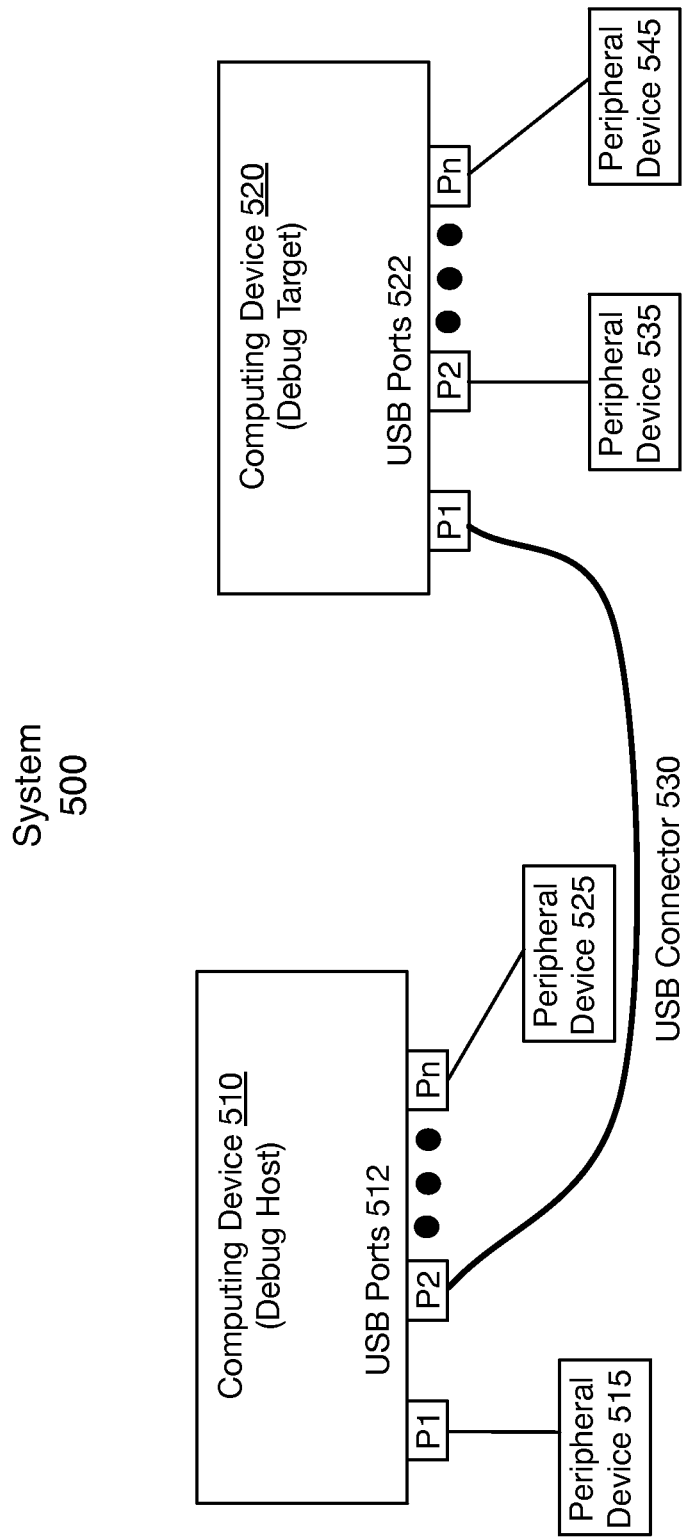
FIG. 5 illustrates an example system to couple computing devices for debugging.

FIG. 5 illustrates an example system 500 to couple computing devices for debugging. As shown in FIG. 5, system 500 includes computing device 510 (Debug Host) and computing device 520 (Debug Target). In some examples, computing device 510 includes USB ports 512 and computing device 520 includes ports 522. As shown in FIG. 5, computing device 510 is coupled to peripheral computing devices 515 and 525 via USB ports P1 and Pn of USB ports 512. Also, computing device 520 is coupled to peripheral computing devices 535 and 545 via USB ports P2 and Pn of USB ports 522. FIG. 5 also depicts computing device 510 coupled to computing device 520 via USB connector 530. For these examples, USB ports 512 and USB ports 522 may all be initially operating in a downstream mode.

In some examples, computing devices 510 and 520 may separately include a USB3 controller similar to USB3 controller 310 described for FIG. 3. For these examples, the USB3 controller may operate in accordance with the xHCI specification. The xHCI specification defines a Super Speed (SS) USB Debug Capability (DbC) feature that enables low-level system debug over a USB coupling between two computing devices. Computing device 510, for example, may be identified as the Debug Host (e.g., no debug capability or debug capability is disabled) and computing device 520 may be a Debug Target (debug capability enabled).

According to some examples, the DbC feature may be implemented at system 500 by first automatically enabling the DbC function on the first computing device that detects an attachment of a USB port from another computing device operating in a downstream mode. For these examples, computing device 520 may detect an attempted attachment of a USB port P2 of computing device 510. Since as mentioned above, USB ports 512 of computing device 510 are operating in a downstream mode, computing device 520 enables its DbC function. Once the DbC function is enabled, computing device 520 may become the Debug Target and computing device 510 may become the Debug Host.

In some examples, the USB3 support system for computing device 520 may automatically switch the operating mode of USB port P2 from a downstream mode to an upstream mode. The automatic switching of USB port P2 from a downstream mode to an upstream mode may enable low-level system debugging over the USB coupling between computing device 510 and computing device 520

Figure 6:
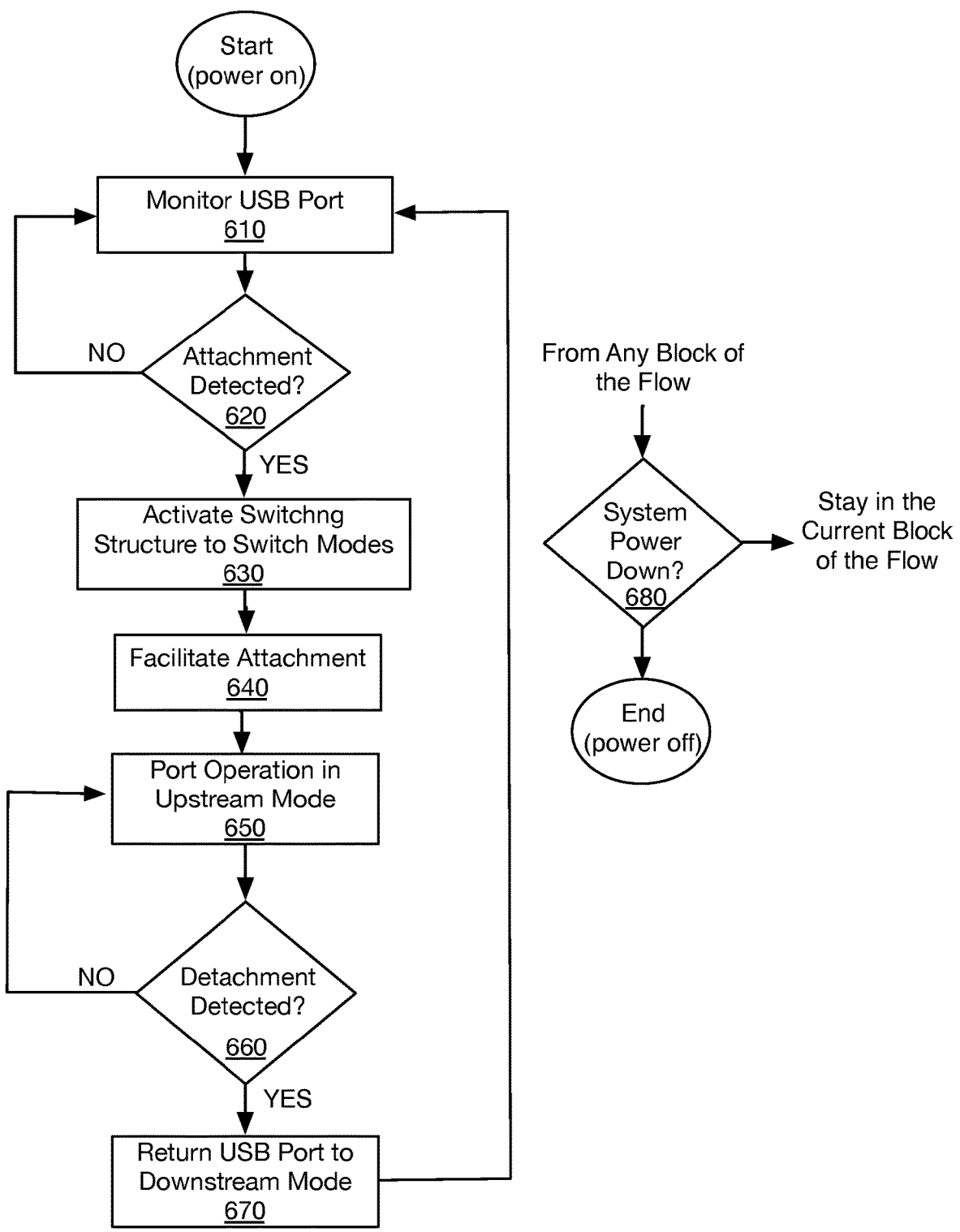
FIG. 6 illustrates a flow chart of example operations for automatic downstream to upstream switching at a USB physical (PHY) layer.

FIG. 6 illustrates a flow chart of example operations for automatic downstream to upstream switching at a USB PHY layer. In some examples, elements of USB support system 100, USB3 Super Speed support system 300 or USB2 support system 200 as shown in FIGS. 1, 3 and 4 may be used to illustrate example operations related to the flow chart depicted in FIG. 6. Mode switch manager 180 as shown in FIGS. 1-4 may also be used to illustrate the example operations. But the described operations are not limited to implementations on the above-mentioned USB support systems or to mode switch manager 180.

Moving from the start to block 610 (Monitor USB Port), mode switch manager 180 may include logic and/or features configured to monitor (e.g., via monitor feature 212) one or more USB ports for a first computing device. In some examples, mode switch manager 180 may monitor a register maintained by a USB controller. In other examples, mode switch manager 180 may monitor VBus states at PHY interfaces (e.g., PHY interfaces 490-1 to 490-n) associated with the one or more USB ports.

Moving from block 610 to decision block 620 (Attachment Detected?), mode switch manager 180 may include logic and/or features configured to determine whether a downstream operating USB port for a second computing device has attempted to attach to a first USB port from among the one or more USB ports for the first computing device. In some examples, an indication of an attachment may be included in the register maintained by the USB controller. In other examples, an indication of an attachment may be based on the USB port for the second computing device detected as driving the VBus for the PHY interface associated with the first USB port. If attachment is detected, the process moves to block 630. Otherwise, the process moves back to block 610.

Moving from decision block 620 to block 630 (Activate Switching Structure to Switch Modes), mode switch manager 180 may include logic and/or features configured to activate (e.g., via mux feature 214) a switching structure at the PHY layer for the first USB port. In some examples, the switching structure may include multiplexors as described for switching structures 370 and 470. For these examples, mode switch manager 180 may generate mux select signals to cause the first USB port to switch from operating in a downstream mode to operate in an upstream mode.

Proceeding from block 630 to block 640 (Facilitate Attachment), mode switch manager 180 may include logic and/or features configured to facilitate an attachment. In some examples, the attachment may be with the USB port for the second computing device to the first USB port now operating in the downstream mode. For some of these examples, mode switch manager 180 may drive signals (e.g., via signal feature 216) via communication channels (e.g., communication channels 306) coupled to a Tx link coupling the first USB port to its corresponding PHY interface to indicate that no receiver is detected. Mode switch manager 180 may also send a signal (e.g., via PHY interface feature 218) to the corresponding PHY interface that may lead the second computing device to determine that the first USB port appears to have detached from its downstream operating USB port. Mode switch manager 180 may then remove the signal and now make it seem that the first USB port is attempting a new attachment. But this time the first USB port is operating in an upstream mode and this may lead to a successful coupling with the downstream operating USB port for the second computing device.

Proceeding from block 640 to block 650 (Port Operation in Upstream Mode), the first USB port may then be operated in an upstream mode (e.g., as a peripheral).

Proceeding from block 650 to decision block 660 (Detachment Detected), mode switch manager 180 may include logic and/or features configured to determine whether the second computer has detached its USB port (e.g., via monitor feature 212). If a detachment is detected, the process moves to block 670. Otherwise, the process moves back to block 650.

Moving from decision block 660 to block 670 (Return USB Port to Downstream Mode), mode switch manager 180 may include logic and/or features to return the first USB port back to the downstream operating mode (e.g., via mux feature 214). In some examples, mode switch manager 180 may generate mux select signals to cause the first USB port to switch back to operating in the downstream mode. The process may then move back to block 610 to monitor the first USB port for subsequent attempts by another USB port for another computing device to attach to the first USB port.

Proceeding from any block of the flow to decision block 670 (System Power Down?), mode switch manager 180 may include logic and/or features configured to detect whether either the first computing device or the USB support system for the first computing device is powering down (e.g., via monitor feature 212). In some examples, if a powering down is detected the process comes to an end. Otherwise, the process stays in the current block of the flow.

Figure 7:
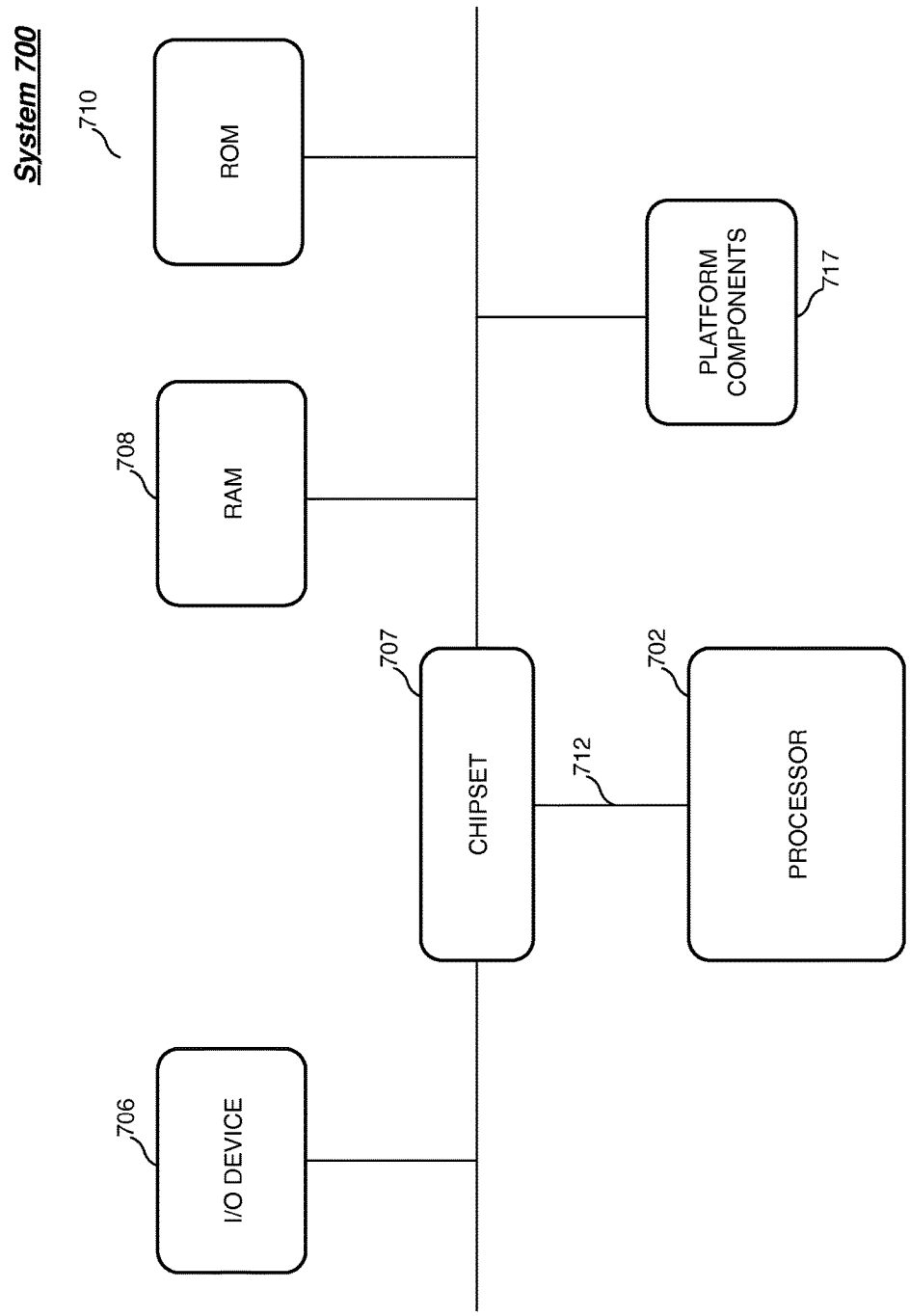
FIG. 7 illustrates an example system for a computing device.

FIG. 7 is a diagram of an example system 700 for a computing device. In particular, FIG. 7 is a diagram showing a system 700, which may include various elements. For instance, FIG. 7 shows that system 700 may include a processor 702, a chipset 704, an input/output (I/O) device 706, a random access memory (RAM) (such as dynamic RAM (DRAM)) 708, and a read only memory (ROM) 710, and various platform components 717 (e.g., a fan, a cross-flow blower, a heat sink, DTM system, cooling system, housing, vents, and so forth). These elements may be implemented in hardware, software, firmware, or any combination thereof. The embodiments, however, are not limited to these elements.

As shown in FIG. 7, I/O device 706, RAM 708, and ROM 710 are coupled to processor 702 by way of chipset 704. Chipset 704 may be coupled to processor 702 by a bus 712. Accordingly, bus 712 may include multiple lines. In various examples, chipset 704 may be integrated or packaged with processor 702. Other examples are described and claimed.

Processor 702 may be a central processing unit including one or more processor cores and may have any number of processors including any number of processor cores. The processor 702 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 700 may include various interface circuits, such as an Ethernet interface and/or a Universal Serial Bus (USB) interface, and/or the like. In some exemplary embodiments, the I/O device 706 may include one or more input devices connected to interface circuits for entering data and commands into the system 700. For example, the input devices may include a keyboard, mouse, touch screen, track pad, track ball, isopoint, a voice recognition system, and/or the like. Similarly, the I/O device 706 may include one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 700 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture. An article of manufacture may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

According to some examples, an article of manufacture may include a non-transitory storage medium to store or maintain instructions that when executed by a computer or system, cause the computer or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a computer to perform a certain function. The instructions may be implemented using any suitable high-level, low-level, object-oriented, visual, compiled and/or interpreted programming language.

In some examples, operations described in this disclosure may also be at least partly implemented as instructions contained in or on an article of manufacture that includes a non-transitory computer-readable medium. For these examples, the non-transitory computer-readable medium may be read and executed by one or more processors to enable performance of the operations.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
monitoring, by a processor circuit, a first universal serial bus (USB) port for a first computing device, the first USB port to be in an active state and operating in a downstream mode, the first USB port to be controlled by a USB controller;
monitoring a register for the USB controller, the register to indicate a status of the first USB port, the status comprising whether the first USB port is in the active state or an inactive state;
determining that a second USB port for a second computing device has attempted to attach to the first USB port, the second USB port operating in the downstream mode;
changing the status of the first USB port to the inactive state responsive to the first USB port and the second USB port operating in a downstream mode;
activating a switching structure at a physical (PHY) layer for the first USB port to switch the first USB port from operating in the downstream mode to operating in an upstream mode responsive to a determination that the second USB port has attempted to attach to the first USB port and a change of the status of the first USB port to the inactive state; and
facilitating attachment of the first USB port operating in the upstream mode to the second USB port operating in the downstream mode.

2. The method of claim 1, USB controller to operate in compliance with the eXtensible Host Controller Interface (xHCI) for USB specification, the PHY layer including a PHY interface operating in compliance with the PHY Interface for the PCI Express and USB 3.0 Architectures (PIPE3) specification.

3. The method of claim 2, wherein the register is a PORTSC register for the USB controller.

4. The method of claim 2, comprising facilitating attachment of the first USB port operating in the upstream mode to the second USB port operating in the downstream mode includes causing the first USB port operating in the upstream mode to appear to the second USB port operating in the downstream mode as a new attachment and responsive to the new attachment, the second port attempts to attach to the first USB port operating in the upstream mode.

5. The method of claim 1, comprising the first USB port being controlled by a USB controller operating in compliance with the enhanced Host Controller Interface (eHCI) for USB specification and the PHY layer including a PHY interface operating in compliance with one of the USB Transceiver Macrocell Interface (UTMI) specification or the USB Low Pin Interface (ULPI) specification.

6. The method of claim 5, comprising monitoring VBus states at the PHY interface operating in compliance with one of the UTMI specification or the ULPI specification.

7. The method of claim 6, comprising determining that the second USB port has attempted to attach to the first USB port operating in the downstream mode based on the VBus states indicating that a downstream port has driven the VBus states to a high state in an attempt to attach to the first USB port operating in the downstream mode.

8. An apparatus comprising:
a processor circuit;
a switching structure at a physical (PHY) layer for one or more universal serial bus (USB) ports for a first computing device, the switching structure configured to switch operation of a first USB port from a downstream mode to an upstream mode, the first USB port from among the one or more USB ports for the first computing device, the first USB port to be controlled by a USB controller;
a register for the USB controller, the register to indicate a status of the first USB port, the status comprising whether the first USB port is in an active state or an inactive state; and
a memory unit communicatively coupled to the processor circuit, the memory unit arranged to store a mode switch manager operative on the processor circuit to:
monitor the register;
determine that a second USB port for a second computing device has attempted to attach to the first USB port, the second USB port operating in the downstream mode;
change the status of the first USB port to the inactive state responsive to the first USB port and the second USB port operating in a downstream mode;
detecting a change in the register indicating the first USB port operating in the downstream mode is in an inactive state;
activate the switching structure to switch the first USB port to operate in the upstream mode based on detection of an attempt by the second USB port to attach to the first USB port and a change of the status of the first USB port to the inactive state; and
facilitate attachment of the first USB port to be operated in the upstream mode to the second USB port operated in the downstream mode.

9. The apparatus of claim 8, comprising a USB connector to communicatively couple the first computing device to the second computing device via the first USB port for the first computing device and via the second USB port for the second computing device.

10. The apparatus of claim 8, comprising the one or more USB ports for the first computing device being controlled by a USB controller configured to operate in compliance with the eXtensible Host Controller Interface (xHCI) for USB specification and the PHY layer to include a PHY interface configured to operate in compliance with the PHY Interface for the PCI Express and USB 3.0 Architectures (PIPE3) specification.

11. The apparatus of claim 10, wherein the register is a PORTSC register for the USB controller.

12. The apparatus of claim 10, comprising the mode switch manager configured to cause the first USB port to be operated in the upstream mode to appear to the second port operated in the downstream mode as a new attachment in order to facilitate attachment of the first USB port to the second USB port and responsive to the appearance of the new attachment, the second USB port to attempt to attach to the first USB port operated in the upstream mode.

13. The apparatus of claim 8, comprising the one or more USB ports for the first computing device being controlled by a USB controller configured to operate in compliance with the enhanced Host Controller Interface (eHCI) for USB specification and the PHY layer to include a PHY interface configured to operate in compliance with one of the USB Transceiver Macrocell Interface (UTMI) specification or the USB Low Pin Interface (ULPI) specification.

14. The apparatus of claim 13, comprising the mode switch manager configured to monitor VBus states at the PHY interface configured to operate in compliance with one of the UTMI specification or ULPI specification, based on the monitored VBus states, the mode switch manager to determine whether the second USB port for the second computing device has attempted to attach to the first USB port while the first USB port was operated in the downstream mode.

15. The apparatus of claim 14 comprising the mode switch manager configured to determine that the second USB port has attempted to attach to the first USB port operated in the downstream mode based on an indication of the VBus states that indicates a downstream port has driven the VBus states to a high state in an attempt to attach to the first USB port operated in the downstream mode.

16. An article of manufacture comprising a non-transitory storage medium containing instructions that when executed cause a system to:
  monitor a first universal serial bus (USB) port for a first computing device, the first USB port to be in an inactive state and operating in a downstream mode, the first USB port to be controlled by a USB controller;
  monitor a register for the USB controller, the register to indicate a status of the first USB port, the status comprising whether the first USB port is in an active state or the inactive state;
  determine that a second USB port for a second computing device has attempted to attach to the first USB port, the second USB port operating in the downstream mode;
  change the status of the first USB port to the inactive state responsive to the first USB port and the second USB port operating in a downstream mode;
  activate a switching structure at a physical (PHY) layer for the first USB port to switch the first USB to operate in an upstream mode responsive to a determination that the second USB port has attempted to attach to the first USB port and a change of the status of the first USB port to the inactive state; and
  facilitate attachment of the first USB port operating in the upstream mode to the second USB port operating in the downstream mode.

17. The article of manufacture of claim 16, comprising the first USB port controlled by a USB controller configured to operate in compliance with the eXtensible Host Controller Interface (xHCI) for USB specification and the PHY layer to include a PHY interface configured to operate in compliance with the PHY Interface for the PCI Express and USB 3.0 Architectures (PIPE3) specification.

18. The article of manufacture of claim 17, comprising the instructions to cause the system to cause the first USB port to be operated in the upstream mode to appear to the second port operated in the downstream mode as a new attachment in order to facilitate attachment of the first USB port to the second USB port and responsive to the appearance of the new attachment, the second USB port to attempt to attach to the first USB port operated in the upstream mode.

19. The article of manufacture of claim 16, comprising the first USB port being controlled by a USB controller configured to operate in compliance with the enhanced Host Controller Interface (eHCI) for USB specification and the PHY layer to include a PHY interface configured to operate in compliance with one of the USB Transceiver Macrocell Interface (UTMI) specification or the USB Low Pin Interface (ULPI) specification.

* * * * *